(12) United States Patent
Arecco et al.

(10) Patent No.: US 6,456,406 B1
(45) Date of Patent: Sep. 24, 2002

(54) TRANSPARENT OPTICAL SELF-HEALING-RING COMMUNICATION NETWORK

(75) Inventors: Fulvio Arecco, Monza; Fausto Meli, Piacenza; Marcos Antonio Brandao Sanches, Monza, all of (IT)

(73) Assignee: Cisco Photonics Italy S.r.L., Milan (IT)

( * ) Notice: Subject to any disclaimer, the term of this patent is extended or adjusted under 35 U.S.C. 154(b) by 0 days.

(21) Appl. No.: 09/261,630

(22) Filed: Mar. 3, 1999

Related U.S. Application Data (63) Continuation of application No. 08/729,909, filed on Oct. 15, 1996, now Pat. No. 5,903,371.

(30) Foreign Application Priority Data

Oct. 19, 1995 (IT) .......................................... MI95A2154

(51) Int. Cl.[7] ................................................. H04J 14/02
(52) U.S. Cl. ........................ 359/119; 359/110; 359/127; 359/128
(58) Field of Search ................................. 359/110, 119, 359/128, 130, 166, 161, 127

(56) References Cited

U.S. PATENT DOCUMENTS

| | | | | |
|---|---|---|---|---|
| 5,586,115 A | * | 12/1996 | Nakano et al. | 359/117 |
| 5,612,805 A | * | 3/1997 | Fevrier et al. | 359/124 |
| 5,647,035 A | * | 7/1997 | Cadeddu et al. | 359/119 |
| 5,680,235 A | * | 10/1997 | Johansson | 359/110 |
| 5,956,319 A | * | 9/1999 | Meli | 370/224 |

OTHER PUBLICATIONS

Elrefaie, Multiwavelength Survivable Ring Network Architectures, IEEE International conference on Communications, pp. 1245–1251, May 23, 1993.*
Sonosky et al, SONET Ring Applications for Survivable Fiber Loop Networks, IEEE Magazine, pp. 51–58, Jun. 29, 1991.*
Merli, Analisi E Dimensionamento Di Un Anello Ottico Trasparente, Per Sistemi D–WDM, Con Funzioni D Riconfigurazione, Automatica In Caso Di Rottura Dell' Amello E Di "Drop–Insert" Locale Dei, Fotonica '95.*
Almstrom et al, A Uni–Directional Self–Healing Ring Using WDM Technique.*

* cited by examiner

Primary Examiner—Leslie Pascal
(74) Attorney, Agent, or Firm—Oblon, Spivak, McClelland, Maier & Neustadt, P.C.

(57) ABSTRACT

An optical self-healing-ring communication network is described which includes: a first optical communication line, forming a closed optical path; at least two add/drop nodes for optical signals, optically connected along the line; a second optical communication line forming a closed optical path and optically connected to the optical-signal add/drop nodes. Defined in the network are first and second mutually opposite. travel directions of the optical signals, with respect to the position of the optical-signal add/drop nodes. At least one of said nodes further comprises selection means, controlled by the optical signals, for the selective dropping of the optical signals from one of the communication lines. At least one of the optical-signal add/drop nodes further includes means for the simultaneous input of at least one optical signal in the first direction along the first communication line and in the second direction along the second communication line.

24 Claims, 5 Drawing Sheets

TRANSPARENT OPTICAL SELF-HEALING-RING COMMUNICATION NETWORK

DESCRIPTION

This application is a continuation of application Ser. No. 08/729,909 filed Oct. 15, 1996, now U.S. Pat. No. 5,903,371.

The present invention relates to a transparent communication network for optical-signal transmission, having a ring-shaped structure, comprising a double communication line and nodes located along the line for adding and dropping signals related to one or more communication channels, from and into the ring respectively.

In the network, generally along optical fibres, signals corresponding to different channels, each having a different wavelength, travel together, according to the so-called wavelength division multiplexing (or WDM) technique. The components of one signal having a wavelength corresponding to one channel are dropped from the network and added thereinto in an optical form, at the nodes. The network enables transmission of optical signals without intermediate conversions to the electric form and it is therefore transparent to the particular structure of the elementary information to be transmitted (usually electric signals in a digital form).

In optical-signal transmitting networks the amount of the exchanged information is very high. For this reason, a failure can have very severe consequences in that a very high number of subscribers can be deprived of the information flow.

Typical failures may be breaking of an optical fibre, because said fibre can be, for example, accidentally cut by operators not aware of the presence of same, and a cutoff in the operation of the whole node, due for example to a fire, lack of electric energy or failure of one component.

In order to face such a situation in an automatic manner and within sufficiently short periods of time so that the information flow is not interrupted, self-healing-ring networks have been conceived.

In these networks the different nodes are connected with each other- by two optical-fibre lines, closed upon themselves to form a ring: a primary ring line (also referred to as external or working ring) and a secondary ring line (also referred to as internal or protection ring). Under normal conditions signals travel in one direction alone on the primary line and are dropped from and/or added into the different nodes depending on the wavelength.

In the case of a node failure, or breaking of a primaryline optical fibre between an upstream and a downstream node, continuity is restored by diverting the signal flow from the primary to the secondary line in the node which is upstream of the breaking (with respect to the signal travel direction in the primary line) and from the secondary to the primary line in the downstream node. In the secondary line, signals travel in the opposite direction with respect to the primary line. In order to perform these diversions in an automatic manner from one ring line to another, two so-called "2×2" directional switches are provided for use in the nodes, which directional switches are optical four-way components having two inputs and two outputs. In a normal configuration, the first output is optically connected to the first input and the second output is optically connected to the second input, whereas in a switched-over configuration the first output is optically connected to the second input and the second output is optically connected to the first input.

A node of this type is described for example in an article by S. Merli, A. Mariconda and R. de Sanctis entitle "Analisi e dimensionamento di un anello ottico trasparente per sistemi D-WDM, con funzioni di riconfigurazione automatica in caso di rottura dell'anello e di Drop-Insert locale dei canali" (Analysis and dimensioning of a transparent optical ring for D-WDM systems having functions of automatic reconfiguration in case of ring breaking and local Drop-Insert of the channels), Atti del Convegno FOTONICA '95 (FOTONICA '95 Meeting Records), Sorrento, IT, May 1995. It enables signals to be diverted to the secondary ring line in case of breaking of the primary ring line. In addition, it enables the optical user unit of the node (typically a wavelength-selective optical switch, for adding and dropping the signals of a channel having a predetermined wavelength) to be bypassed in case of failure of same, while saving transmission between the remaining network nodes.

Networks of this type require a central unit capable of recognizing and localizing an occurred failure (for example, through signaling of the lack of signal by the node located downstream of the failure, which can carry out switching of the optical signal to the service line in a self-governing manner) and of sending to the node upstream of the failure, the switching-over command so that it can receive signals from the service line. For this reason it is necessary for the central unit to communicate with each of the nodes, also and above all in case of failure in the communication line. Therefore emergency lines for connection between the nodes and the central unit need to be arranged, which lines must be independent of the ring line for communication between the nodes. These emergency lines (that can be optical, electrical, or radio link lines or lines of any other type) together with the central unit involve an important complication in the communication network.

In addition, in network architectures of the above stated type, the time necessary for transmitting the information about the occurred failure to the central unit, processing the information by said unit and transmitting the switching over command to the node upstream of the failure is to be added to the intervention time by the directional switches, establishing the overall time for recovery of the network functionality after a break. This overall recovery time can be much higher than the intervention time of a directional switch, presently reaching values on the order of some milliseconds in switches of the acousto-optical or magneto-optical type or some tens of milliseconds in switches of the mechanical type.

An optical self-healing-ring network is also described in an article "A uni-directional self-healing ring using WDM technique", by E. Almstrom et al., ECOC '94 Conference Proceedings, Florence, IT, 25–29 Sep., 1994, vol. 2, pages 873–875. The optical network contemplates the use in the nodes of optical switches having more than one input and more than one output. The network is shaped so that the nodes can close the ring on the protection fibre, as soon as they detect a break along at least one of the fibres.

According to one aspect, the present invention relates to an optical self-healing-ring communication network comprising:

one optical communication line forming a first closed optical path;

at least two optical-signal add/drop nodes optically connected along said optical communication line;

a second optical communication line forming a second closed optical path and optically connected to said optical-signal add/drop nodes;

in which at least one of said nodes comprises controlled selection means for selectively dropping said optical signals from one of said first and second communication lines, wherein at least one of said optical-signal add/drop nodes further comprises means for the simultaneous input of at least one optical signal into said first communication line and into said second communication line.

In particular, defined in the optical ring communication network is a first and a second travel direction of said optical signals relative to the position of said optical-signal add/drop nodes, said first and second directions being opposite to each other and said network comprises means for the simultaneous input of at least one optical signal in said first direction along said first communication line and in said second direction along said second communication line.

Preferably the optical ring communication network comprises one pair of optical-signal add/drop nodes, optically connected with each other, in which the signals transmitted between the nodes of said first pair have a first wavelength, and at least one of said first and second optical paths comprises a second pair of optical-signal add/drop nodes, optically connected with each other, the signals transmitted between the nodes of said second pair having a second wavelength different from said first wavelength.

In particular, in the optical self-healing-ring communication network according to the present invention at least one of said optical-signal nodes comprises:

one optical-signal add/drop unit, connected in series by respective line input and output ports to said first optical path, further having respective signal add and drop ports;

a second optical-signal add/drop unit, connected in series by respective line input and output ports to said second optical path, further having respective signal add and drop ports;

a controllable optical switch having a first and a second selectable inputs connected to the signal drop ports of said first and second optical-signal add/drop units respectively, and one output;

a terminal line unit having an optical input connected to said output of said optical switch and having two optical outputs connected to the signal add ports of said first and second optical-signal add e drop units;

means for detecting the presence of the optical-signal at said drop ports of said first and second optical-signal add/drop units, operatively connected to said controllable optical switch for selection of a respective one of said first and second inputs.

Preferably, said first and second optical-signal add/drop units each comprise a demultiplexing unit of said received optical signals at the respective wavelengths and an optical-signal multiplexing unit at the respective wavelengths, and the outputs of said demultiplexing units corresponding to the wavelengths included within said bypass band are selectively connected to corresponding inputs of said multiplexing units.

In a second aspect, the optical self-healing ring communication network according to the present invention comprises a firs t and a second optical self-healing-ring telecommunication network, as previously defined, wherein at least one optical node of said first network is optically connected to at least one optical node of said second network.

In another aspect, the present invention relates to an optical self-healing-ring telecommunication method in an optical telecommunication network, which comprises feeding at least one optical signal from a first add/drop node in a first closed optical path included within said network, to a second add/drop node serially connected in said first closed optical path, characterized in that it further comprises the steps of:

simultaneously feeding said optical signal from said first add/drop node to said first closed optical path and to a second closed optical path included in said network, said second optical path comprising said second add/drop node serially connected thereinto, and selectively receiving said at least one optical signal in said second add/drop node from one of said first and second closed optical paths.

In particular, said optical telecommunication method is characterized in that said step of feeding an optical signal to said first and second closed optical paths comprises feeding said signal in two opposite directions with respect to said first add/drop node.

In particular, said step of selectively receiving said optical signal in said second add/drop node comprises:

detecting the presence of said signal in said first closed optical path in said second node, and operatively switching over reception from said first closed optical path to said second closed optical path in the absence of signal in said first closed optical path.

In a preferred embodiment thereof, the optical telecommunication method according to the present invention is characterized in that said first and second optical-signal add/drop nodes form a first pair of nodes optically connected with each other, wherein the signals transmitted between the nodes of said first pair have a first wavelength, and at least one of said first and second optical paths comprises a second pair of optical-signal add/drop nodes, optically connected with each other, the signals transmitted between the nodes of said second pair having a second wavelength different from said first wavelength.

In particular the optical telecommunication method comprises adding and dropping optical signals having a wavelength included within a communication band in a first and a second add/drop units, wherein said first and second units comprise optical-signal drop outputs and optical-signal add inputs and said step of adding and dropping optical signals comprises:

receiving optical signals from said first and second closed optical paths, respectively;

sending to said drop outputs, the received optical signals of a wavelength extending within a predetermined dropping band included in the communication band;

sending to said first and second closed optical paths respectively, the received optical signals of a wavelength extending within a predetermined bypass band, included within the communication band and having no overlap with said dropping band;

sending to said first and second closed optical paths respectively, the optical signals present at said add inputs, of a wavelength included within said dropping band.

More details will become more apparent from the following description, with reference to the accompanying drawings, in which.

Figure 1:
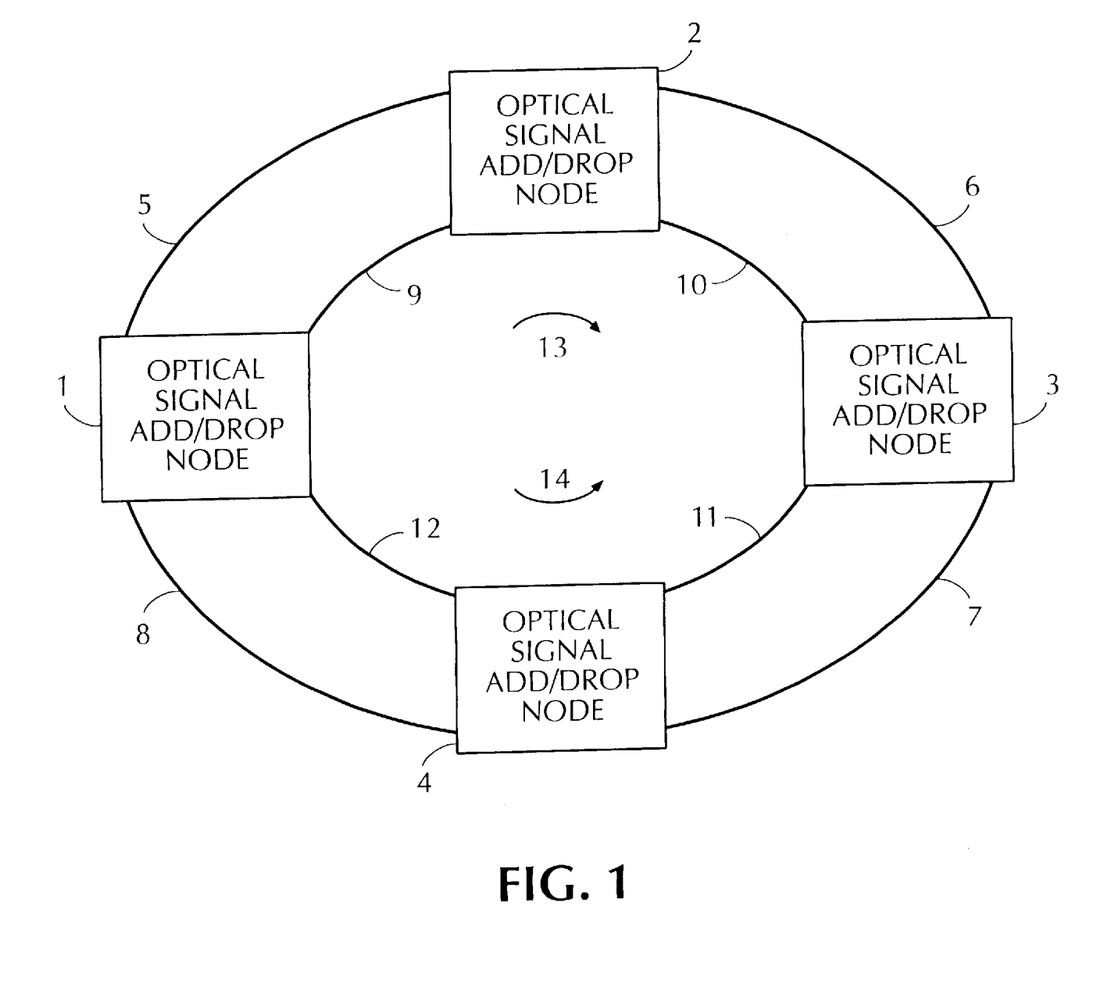
FIG. 1 is a diagram of an optical communication network according to the present invention.

Diagrammatically shown in FIG. 1 is an optical communication network according to the present invention, adapted to transmit optical signals at a wavelength included within a predetermined band called communication band. Respective nodes for adding and dropping optical signals have been denoted by 1, 2, 3 and 4 in said figure.

Denoted by 5, 6, 7, 8 are portions of a main transmission line, adapted to transmit optical signals from nodes 1, 2, 3, 4 to nodes 2, 3, 4, 1 respectively, in the direction shown by arrow 13, called the main direction, and altogether forming a closed transmission ring named main ring.

Denoted by 9, 10, 11, 12 are portions of a secondary transmission line adapted to transmit optical signals from nodes 2, 3, 4, 1 to nodes 1, 2, 3, 4 respectively, in the direction shown by the arrow 14, called the secondary direction, and altogether forming a closed transmission ring named secondary ring.

The optical-signal add/drop nodes will be described in detail in the following. The transmission line portions are preferably made of stretches of single-mode optical fibre. The optical fibre pairs (of the main and secondary rings, respectively) connecting the same optical nodes can be housed in one and the same cable.

While in t he following of the present description reference is made to the case, shown in the figure, of four optical-signal add/drop nodes, the present invention is not limited to this particular number and is intended as extended to different numbers of nodes. In particular, an optical communication network according to the present invention may comprise a number of nodes correlated with the number of wavelengths used for signal transmission. Preferably a wavelength connects a single pair of optical nodes where signal add/drop at that wavelength is carried out.

Figure 2:
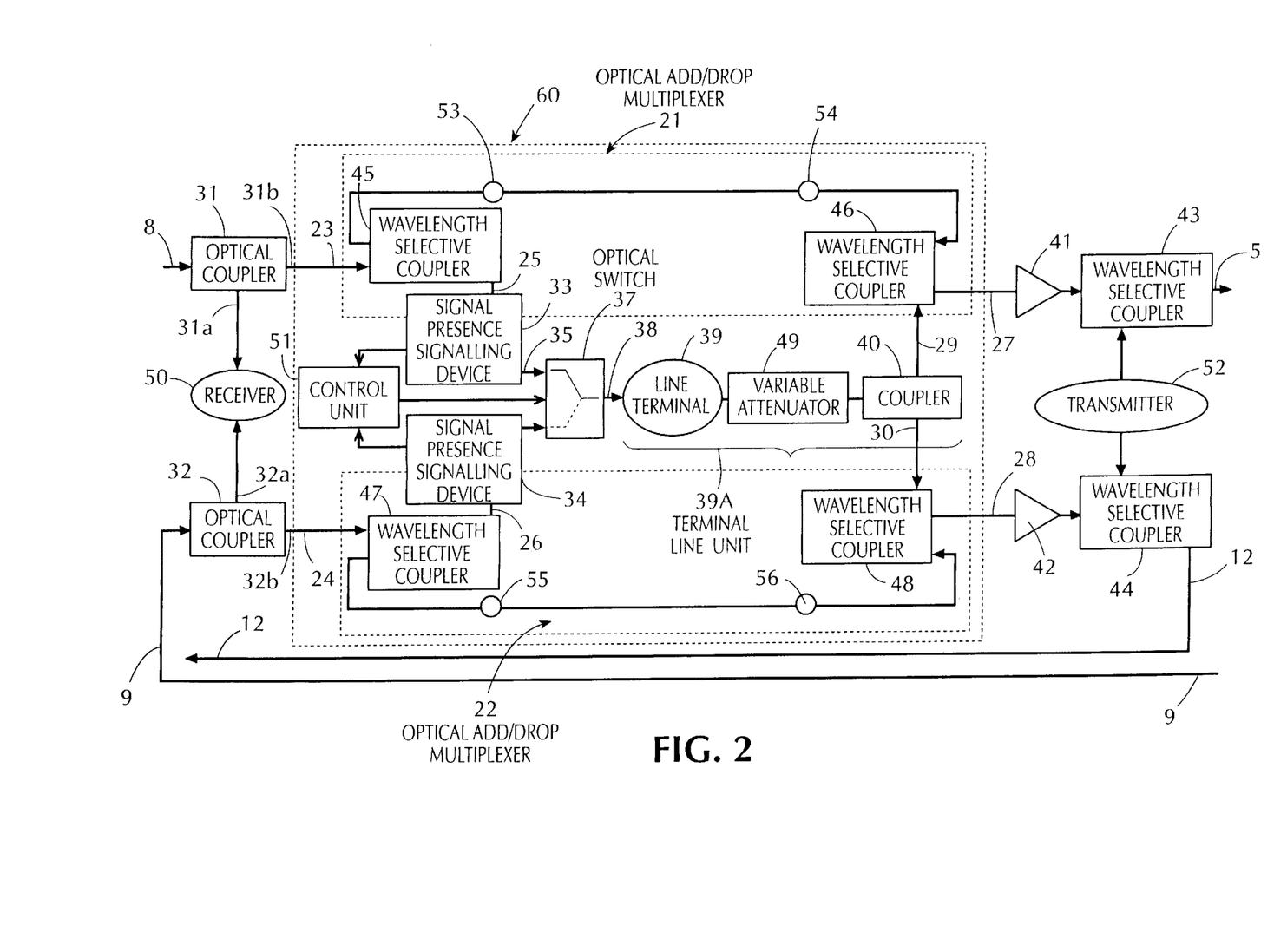
FIG. 2 is a diagram of an optical node according to the present invention for adding/dropping optical signals along an optical communication network.

Diagrammatically shown in FIG. 2 is an optical node for optical signals add/drop into/from a communication network, adapted for use in the communication network described with reference to FIG. 1, for example.

The node uses two optical-signal add/drop units, to/from one portion of main transmission line and to/from one portion of secondary transmission line, respectively. The two units, also referred to as OADM (Optical Add-Drop Multiplexer), are identified by 21 and 22 respectively in FIG. 2.

The OADM 21 receives at one input thereof 23, the optical signals from a portion of the main transmission line, circulating in the main direction along the main ring.

The OADM 22 receives at one input 24 thereof, the optical signals from one portion of the secondary transmission line, circulating in the secondary direction along the secondary ring.

OADMs 21 and 22 are optical devices adapted to separate the incoming optical signals, based on the respective wavelengths, so as to send to outputs 25 and 26 respectively, called drop outputs, the signals of a wavelength extended within a predetermined band (included within the communication band) which is different for each of the nodes and is called dropping band, and to send to outputs 27 and 28 respectively, named bypass outputs, the optical signals of a wavelength extended within a predetermined band (included within the communication band) which is different for each of the nodes and has no overlap with the dropping band, named bypass band. OADMs 21 and 22 are also adapted to send optical signals of a wavelength included within the dropping band and present at inputs 29 and 30 respectively, named add inputs, to the bypass outputs 27, 28.

In the following description reference will be made to the optical node 1 of the communication network shown in FIG. 1, the description being the same for the remaining optical nodes.

The communication network can contemplate the transmission between optical nodes of telemetry and service channels. For this purpose it is possible to use optical signals of a wavelength in a band different from the communication band. For example, when the communication band corresponds to the third optical telecommunication window, around the wavelength of 1550 nm, it is possible for the transmission of telemetry channels to use optical signals of a wavelength included within the second optical telecommunication window, around the wavelength of 1300 nm.

If telemetry channels are present, optical signals reaching the optical node from the main transmission line portion 8 can be fed to an optical coupler 31, whereas optical signals reaching the node from the secondary transmission line portion 9 are fed to an optical coupler 32. Optical couplers 31 and 32 are wavelength-selective couplers adapted to separate telemetry signals, with a predetermined telemetry wavelength external to the telecommunication band, towards respective outputs 31a, 32a both connected to a telemetry receiver 50, and signals with wavelengths within the telecommunication band towards the other outputs 31b, 32b connected to inputs 23 and 24 of OADMs 21 and 22, respectively.

As already said, OADMs 21 and 22 send the signals having wavelengths included in the dropping band towards respective drop outputs 25 and 26. These outputs are optically connected to signal-presence signaling devices 33 and 34, including photodiodes for example, optically connected to the respective drop outputs 25, 26 through corresponding optical couplers, and therefrom to inputs 35 and 36 of a 2×1 type optical switch 37, provided with two inputs and one output.

In particular, optical switch 37 has one output 38 which is optically connected to either one of inputs 35 and 36 depending on a signal from a control unit 51 receiving at its input the signal-presence signal from signaling devices 33 and 34.

The control unit 51 comprises processing means, a microprocessor for example, adapted to generate control signals for the switch 37 in response to given conditions. This unit can be of a type known in the art and therefore is not further described.

The output 38 of the optical switch 37 is connected to a line terminal 39. The line terminal 39 comprises an interface between the optical communication network and the users connected thereto. In particular it comprises one or more optical receivers for the communication signals dropped from the network and one or more transmitters, adapted to generate optical signals to be added into the network, of wavelengths corresponding to those of the signals dropped from the network. The line terminal 39 can be of known type and is not further described.

The optical signals generated from the line terminal 39 are sent, possibly through a variable attenuator 49 (adapted to equalize the power of the emitted signals of the line terminal with the power of the signals bypassed by the OADM unit and inputted into the network again) to an optical coupler 40, adapted to equally divide the optical radiation into two outputs connected to the add inputs 29 and 30 of the OADMs 21 and 22, respectively.

As an alternative solution, in place of the individual line terminal 39 and optical coupler 40 connected thereto, a pair of identical optical transmitters can be used for carrying out the signal separation into the two outputs 29, 30, one of said transmitters being used for generating signals to be sent into the main ring and the other for generating the same signals to be sent into the secondary ring. In this case the use of transmitters having a lower output power will be possible and the transmitters will be directly connected to the add inputs 29 and 30 of the OADMs 21 and 22, and the optical coupler 40 can be dispensed with.

In the following, the line terminal 39, variable attenuator 49 if present, and optical coupler 40, or the alternative embodiment comprising two transmitters for the same signals, will be referred to as terminal line unit 39A, for the sake of simplicity.

The bypass outputs 27 and 28 of the OADMs 21 and 22 are connected to the optical amplifiers 41 and 42, respectively, which optical amplifiers may terminate at the input of wavelength-selective couplers 43 and 44. The latter are adapted to combine the signals of a wavelength internal to the telecommunication band and coming from the optical amplifiers, with respective telemetry signals at the telemetry wavelength, coming from a telemetry transmitter 52.

Wavelength-selective coupler 43 is connected to main transmission line portion 5. Wavelength-selective coupler 44 is connected to secondary transmission line portion 12.

The communication network described with reference to FIGS. 1 and 2 enables communication between pairs of optical nodes, by the WDM technique. The optical signals (having one or more wavelengths included within the communication band) produced by one of the nodes, referred to in the following as start nodes, having the configuration shown in FIG. 2, are inputted to the network at the node itself, along the main ring in the main direction and along the secondary ring in the secondary direction. Possible intermediate optical nodes can be arranged in a way to insure substantial signal transparency, without dropping signals at the same wavelengths from the ring or inserting them thereinto, and optionally can compensate, by means of an appropriate optical amplification, the attenuation undergone by signals due to the effect of passive components.

When signals reach a destination node, which also has the configuration shown in FIG. 2, they are dropped from the network by the corresponding OADM units present in the node. Under normal operating conditions of the network, signals from the start node are present at the drop outputs of both OADM units present in the node, after travelling over the related rings in opposite directions. In this case the control unit present in the node drives the optical switch in such a manner that the output of the OADM relative to the main ring (output 25 in FIG. 2) is connected-to the receiver.

If a failure, or even several simultaneous failures, occur along the network, in the stretch between the start and destination nodes in the main direction, due for example to a broken optical fibre in the main ring or to an intermediate optical node out of use, the control unit 51 in the destination node recognizes the absence of optical signal arriving from the OADM relative to the main ring and drives the optical switch to reception from the OADM unit relative to the secondary ring, where the signals sent from the start station and which have travelled over the network in the opposite direction, that is along the portion not concerned with the failure, are present.

Therefore in case of failure, operation of the network can be restored in a self-governed manner by the node itself, by modifying the switching state of the optical switch, without it being necessary to receive orders from a remote central unit and without it being necessary to arrange a connecting network between said central unit and the nodes. The time necessary for restoring the network operation is substantially coincident with the switching-over time of each optical switch, since the time necessary for detecting the absence of signal from the main ring is generally negligible as compared with the switching time, and since no communication between remote units is required.

The wavelengths relative to signals dropped from the destination node can be re-used downstream of the node, by inserting new signals at the same wavelengths in the network at the node itself. These signals too are inputted simultaneously along the main ring in the main direction and along the secondary ring in the secondary direction. The intermediate nodes, in the main direction, between the destination node and start node, must be arranged so that signals at those wavelengths are neither dropped from the network nor inputted thereinto Thus a communication occurs between the destination node and start node, which communication in a quite symmetric way with what previously was described is automatically maintained active even in the case of failure along the network. Hence, there is on the whole a bidirectional communication between the start node and the destination node, a single wavelength of the network communication band for each bidirectional channel being reserved.

addition it is possible to use wavelengths different from those used for the communication between the start and destination nodes to carry out further bidirectional communications between different pairs of nodes.

The described possible operating configurations are given by way of example only, since it is possible in the network to carry out signal transmission between different nodes, with the only exception that it is not possible to add into a node on the network, signals of a wavelength corresponding to a signal already present on the network at the (main and secondary) outputs of that node and it is therefore necessary that the signals at the wavelength in question are dropped from the network by the node itself.

The optical switch 37 can be for example, depending on the required intervention times, model YS-111 manufactured by FDK, having a maximum switching time of 1 ms, or model S-12-L-9 manufactured by DiCon, having a maximum switching time of 20 ms.

Optical amplifiers 41 and 42, adapted to amplify the radiation at the signal wavelengths and to compensate for the attenuation undergone by said signals along the optical ring fibres and in the optical nodes, without intermediate conversions to an electric form, preferably are of the type comprising an optical fibre with a fluorescent dopant, for example of the type described in the patent application EP677902, assigned to the assignee of this application, published on Oct, 18, 1995.

Adapted for use in the present invention are for example optical amplifiers model OLA/E-MW, manufactured by the Assignee of this application, operating in the 1534–1560 nm wavelength band, with an output power ranging between 12 dBm and 14 dBm in the presence of an overall power of the incoming signals ranging from –20 dBm and –9 dBm.

The number and features of the optical amplifiers, both along the main ring and along the secondary ring, can be selected, following known techniques, depending for example on the lengths of the different optical line portions forming the two rings, on the attenuation of the fibre used to make them and the optical components passed through by the signals at the add/drop nodes, and in such a manner that oscillations arising due to the radiation circulating on the closed optical paths of each of the rings is avoided. Optical filters adapted to stop radiation at wavelengths different from the signal wavelengths can be disposed at the optical amplifiers for attenuating the circulating spontaneous emission.

The OADM units can be made for example using a pair of wavelength-selective couplers for each of them. In FIG. 2 the selecting couplers being part of OADM 21 are denoted by 45 and 46, those being part of OADM 22 are denoted by 47 and 48.

By wavelength-selective couplers optical components are meant adapted to convey optical signals at different wavelengths present on two input fibres, to a single output fibre and respectively to separate signals superposed on a single input fibre, into two optical output fibres, depending on the respective wavelengths. Said selective couplers are required to have a passband width adapted to enable a separation of the signals in the two directions, in the absence of crosstalk.

Figure 3:
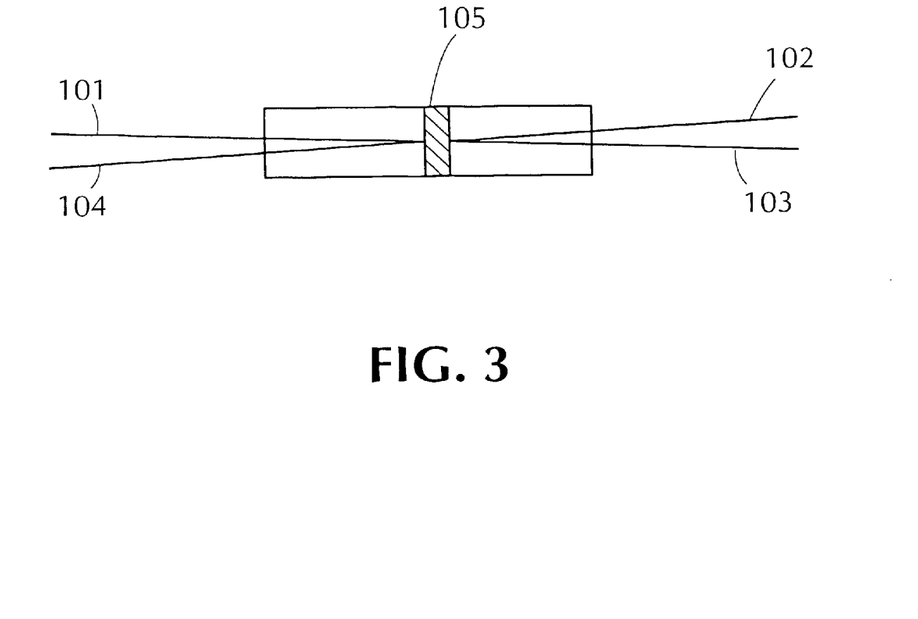
FIG. 3 is a diagram of a directional coupler.

The selective couplers 45, 46, 47, 48 preferably can be of the type schematically shown in detail in FIG. 3, with four optical access fibres (input or output ports) identified by 101, 102, 103, 104 respectively and containing a selective reflecting component 105 in the central part thereof, which component behaves as a band-pass element in transmission and as a band-stop element in reflection, and is therefore adapted to let the signals of wavelengths within a predetermined band pass and to reflect the signals of wavelengths external to such a band. An input signal at fibre 101 of the selective coupler with wavelength $\lambda_p$ internal to the passband of component 105, for example, is transmitted without significant attenuation towards fibre 103 and, likewise, signals of wavelength $\lambda_p$ are transmitted from fibre 104 to fibre 102 or, symmetrically, from fibre 103 to fibre 101 and from fibre 102 to fibre 104. An input signal at fibre 101 of a wavelength $\lambda_p$ external to such a band, on the contrary, is reflected towards fibre 104 and likewise signals of a wavelength $\lambda_p$ proceed from fibre 102 towards fibre 103 and symmetrically from fibre 104 towards fibre 101 and from fibre 103 towards fibre 102.

Figure 4:
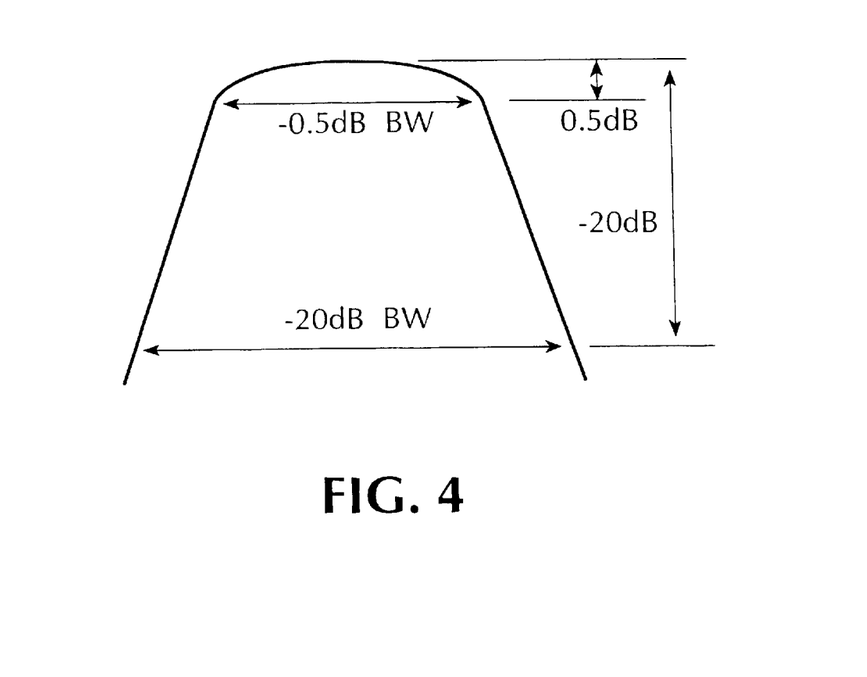
FIG. 4 is a graph of the passband of a directional coupler.

With reference to FIG. 4, shown in the following as the passband of the selective reflecting component 105 or, in a wider sense, as the passband of the selective coupler, is the band of wavelengths close to a minimum attenuation wavelength in transmission, to which, in the transmission through the selective reflecting component 105, an attenuation not exceeding 0.5 dB in addition to the minimum attenuation corresponds. The width of this passband is indicated in FIG. 4 as "−0.5 dB BW".

In the same manner, shown in the following as the reflected band of the selective reflecting component 105 or, i n a wider sense, as the reflected band of the selective coupler, is the ban d of wavelengths close to a minimum attenuation wavelength in reflection to which, in the reflection by the selective reflecting component 105, an attenuation not exceeding 20 dB in addition to the minimum attenuation corresponds.

A configuration of a OADM unit relative to a add/drop node of a signal having a wavelength $\lambda_1$ in a communication network provided for signals at the four wavelengths $\lambda_1$, $\lambda_2$, $\lambda_3$, $\lambda_4$ will be now described, by way of example.

The selective couplers are such selected that wavelength $\lambda_1$ is included in the passband and wavelengths $\lambda_2$, $\lambda_3$, $\lambda_4$ are included in the reflected band.

While the selective couplers have been described with four access fibres, those adapted to the above use can have only three access fibres, the fourth (the one denoted by 104, for example) remaining unused.

With reference to FIG. 2, operation of an OADM unit, such as unit 21 herein shown, will be described This unit is comprised of two selective couplers 45 and 46 connected such that an access fibre of the first coupler is optically connected to an access fibre of the second one. Structure and operation of the corresponding OADM unit 22 are quite identical.

Among the signals at wavelengths $\lambda_1$, $\lambda_2$, $\lambda_3$, $\lambda_4$ present at the input 23 of the selective coupler 45, the $\lambda_1$ wavelength signal is transmitted to the output 25 of the selective coupler itself, which output is coincident with the output 25 of the OADM 21. Signals at the remaining wavelengths $\lambda_2$, $\lambda_3$, $\lambda_4$, are reflected towards the output 53 of the selective coupler 45 optically connected to the input 54 of the selective coupler 46. The same signals are then reflected towards the output 27 of the same coupler which is coincident with the output 27 of the OADM 21. A signal of wavelength $\lambda_1$, present at the input 29 of the selective coupler 46 (or the OADM 21) is reflected towards the output 27 and brought to become superposed with the signals at the other wavelengths, coming from the communication network.

If two nodes located along the network contain OADM units as the one described, having corresponding selective couplers to the same wavelength, the network according to the present invention enables a bidirectional communication between these nodes by means of signals at that wavelength, which communication is quickly activated again in case of failure along the network. The other wavelengths are available for other bidirectional connections between different nodes in the network, which are also self-healing in case of failure.

By way of example, an appropriate selective coupler is model BWDM xTF1, commercialized by E-TEK DYNAMICS Inc., 1885 Lundy Ave., San Jose, Calif. (US), the structure of which corresponds to the description made with reference to FIG. 3, with the only variant that only three access fibres 101, 102, 103 are present. For the selective coupler of the above model, the passband width, as previously defined, is about 4 nm.

While the above description relates to a preferred embodiment comprising wavelength-selective couplers operating in reflection, the OADM units can be made, within the scope of the present invention, using planar acousto-optical devices, other devices in planar optics or other devices equivalent thereto, making use of optical filters for example.

The described node structure can be also extended so as to enable add/drop of two (or more) signals at different wavelengths in one and the same node. For doing so it is sufficient, according to what shown in FIG. 5, to modify the optical-node structure as so far described, by adding one (or more) devices 60', similar to the portion of FIG. 2 enclosed within box 60, in which the OADM units are suitably selected depending on the wavelengths to be added/dropped.

Figure 5:
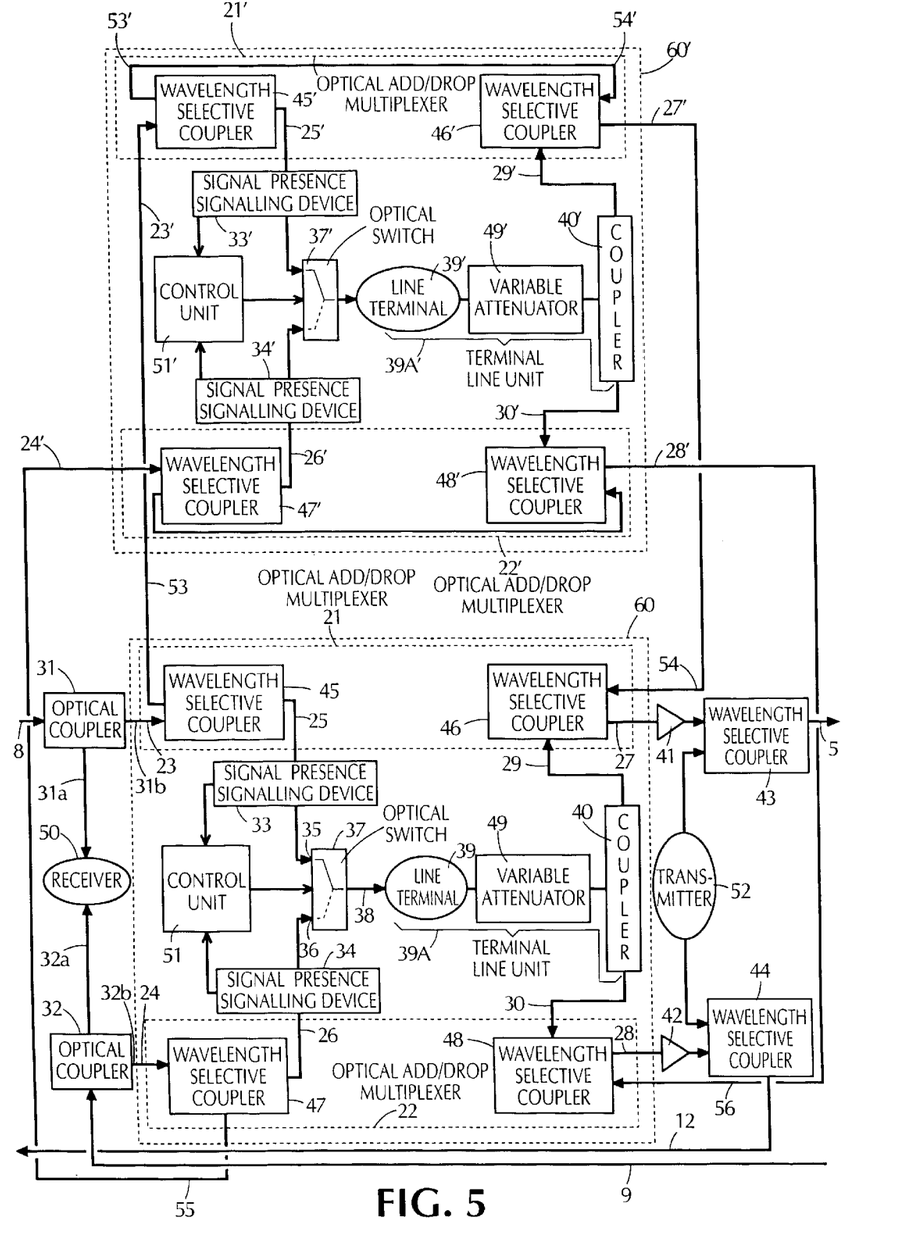
FIG. 5 is a diagram of an optical node according to the present invention for adding/dropping signals at two different wavelengths along an optical communication network.

Numbers with primes will be used to denote the components of the additional device 60' corresponding to the respective components denoted, during the description related to FIG. 2, by same numbers without prime.

Outputs 53, 55 of the selective couplers 45, 47 are optically connected to inputs 23', 24' of selective couplers 45', 47' and inputs 54, 56 of selective couplers 46, 48 are optically connected to outputs 27', 28' of selective couplers 46', 48'. In this device, a signal with wavelength $\lambda_2$ present at the output 53 of the selective coupler 45 is transmitted by the selective coupler 45' to the output 25' and then-processed in the same manner as described in the case of the device of FIG. 2. A signal at the same wavelength $\lambda_2$, generated by the line terminal 39' and present at the input 29' of the selective coupler 46' is in turn transmitted, through the output 27' of same, to the input 54 of the selective coupler 46. Signals at the remaining wavelengths $\lambda_3$, $\lambda_4$, on the contrary, follow an optical path comprising the output 53 of the selective coupler 45, the input 23' of the selective coupler 45', the output 53' of same, connected to the input 54' of the selective coupler 46', and then the output 27' of same and the input 54 of the selective coupler 46, in which superposition with the signals at the. other wavelengths occurs. The signal path in the corresponding OADM units 22, 22' connected with the secondary ring is wholly symmetric with the described one.

The case of add/drop with respect to a single node, of signals at two different wavelengths can be generalized to a higher number of signals at different wavelengths, by addition of corresponding devices 60", 60'", etc . . .

Figure 6:
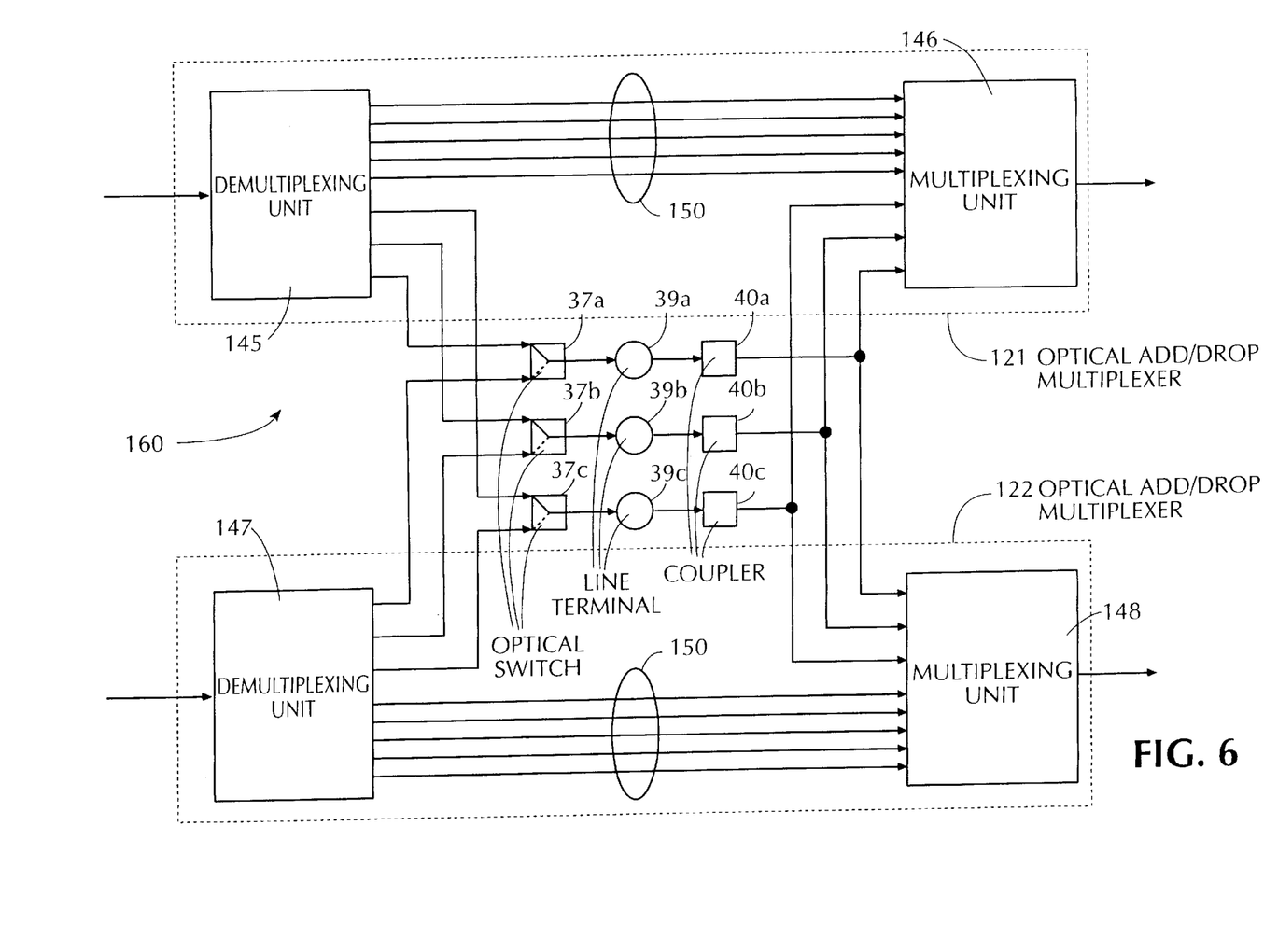
FIG. 6 is a diagram of a reconfigurable node according to the present invention for adding/dropping signals At different wavelengths along an optical communication network.

Another, configurable, optical node for adding/dropping signals along an optical network according to the present invention will be now described with reference to FIG. 6, showing the portion of an optical node corresponding to block 60 in FIG. 2. As to the description of the remaining part of the optical node, reference is made to what already is described in connection with that case.

The shown device, generally indicated by 160, comprises two reconfigurable OADM units 121 and 122.

Each of these units comprises demultiplexing units, denoted by 145 and 147, respectively, adapted to divide the input signals, at the related wavelengths, into a number of outputs, equal to the number of wavelengths used for transmission along the network.

The OADM units 121 and 122 each further comprise one multiplexing units 146, 148, adapted to combine together. in a single output, the signals at the different wavelengths fed to a number of respective inputs, equal to the number of wavelengths used for transmission along the network.

The outputs of demultiplexing units 145, 147 corresponding to the wavelengths that are not to be dropped from the optical node are optically connected to the corresponding inputs of multiplexing units 146, 148, for example by means of optical fibres 150.

The remaining outputs of demultiplexing units 145, 147 corresponding to the signals dropped from the network in the optical node are instead connected to respective optical switches 37a, 37b, 37c, each of them being connected to a line terminal 39a, 39b, 39c, in turn adapted to emit optical signals at the wavelengths of the dropped signals, inputted by couplers 40a, 40b, 40c to respective inputs of multiplexing units 146, 148.

An optical node of this type is reconfigurable without interrupting operation of same, by modifying the connection of one or more pairs of outputs of the demultiplexing units 145, 147 with the corresponding inputs of the multiplexing units 146, 148.

In this manner it is possible to transform the optical node into an add/drop unit for a specific wavelength, by connecting a switch 37, a line terminal 39 and a coupler 40 between the corresponding outputs of the demultiplexing units 145, 147 and the corresponding inputs of the multiplexing units.146, 148.

Likewise, the optical node can be transformed into a bypass unit for a given wavelength, by optically connecting the corresponding outputs of demultiplexing units 145, 147 and the corresponding inputs of multiplexing units 146, 148.

Reconfiguration of a network having optical nodes of this type can be carried out without stopping operation of the nodes themselves.

In addition it is possible to use the optical nodes described with reference to FIGS. 2, 5 and 6 for carrying out add/drop of one or more signals to and from a second ring communication network according to the present invention, independent of a first network, of the type so far described. The second network in this case can have optical nodes similar to those of the first communication network.

One or more wavelengths are reserved, on each of the two networks, for signals exchanged between the two networks. One or more optical signals dropped from a node along the first network are added into the second network at a node thereof and, through the same optical nodes, signals at the same wavelengths are dropped from the second optical network and added into the first optical network.

The signal exchange between the two optical nodes of the two networks can take place by means of optical connections between the corresponding OADM units. The input and output of the OADM located along the main ring of the first network are connected to the input and output respectively of the OADM located along the main ring of the second network, whereas the output and input of the OADM located along the secondary ring of the first network are connected to the input and output respectively of the OADM located along the secondary ring of the second network.

In this manner, at the wavelengths of the signals exchanged between the two networks, an optical ring-shaped super-network is formed which comprises both the connected networks and a bidirectional communication can be established by signals of appropriate wavelengths circulating along both networks, between any node of the first network and any node of the second network. At the remaining wavelengths that are not in common between the two networks, the two networks operate as described, independently of each other.

Also the super-network formed the connection is self-healing in case of failure in any of the two connected networks and, in this case too, recovery from the failure takes place without a control by a central unit being necessary.

What is claimed is:

1. An optical self-healing-ring communication network comprising:
    a first optical communication line forming a first closed optical path;
    a second optical communication line forming a second closed optical path; and
    at least two optical signal add/drop nodes optically connected along said first and second optical communication lines, wherein each of said add/drop nodes comprises a detector for detecting optical signal presence at said respective add/drop node, and a controlled selector for selectively dropping at least one optical signal from one of said first and second communication lines based on the detected optical signal presence by the detector, and a transmitter for simultaneously inputting at least one optical signal into said first and second communication lines.

2. The optical self-healing-ring communication network of claim 1, wherein said first and second optical paths have opposite signal traveling directions.

3. The optical self-healing-ring communication network of claim 1, wherein said at least two optical signal add/drop nodes comprise:
    a first pair of optical signal add/drop nodes optically connected with each other and adapted to transmit between each other signals having a first wavelength; and
    a second pair of optical signal add/drop nodes optically connected with each other and adapted to transmit between each other signals having a second wavelength different from said first wavelength.

4. The optical self-healing-ring communication network of claim 1, wherein at least one of said optical signal add/drop nodes comprises:
   a first optical signal add/drop unit serially connected to said first optical path by first line input and output ports and comprising signal add and drop ports;
   a second optical signal add/drop unit serially connected to said second optical path by second line input and output ports and comprising signal add and drop ports;
   a controllable optical switch having first and second selectable inputs connected to the signal drop ports of said first and second optical signal add/drop units respectively, and an output;
   a terminal line unit comprising an optical input connected to said output of said optical switch and first and second optical outputs connected, respectively, to the signal add ports of said first and second optical signal add/drop units; and
   wherein the detector detects optical signal presence at said drop ports of said first and second optical signal add/drop units and is operatively connected to said controllable optical switch for selection of one of said first and second inputs.

5. The optical self-healing-ring communication network of to claim 4, wherein each of said first and second optical signal add/drop units has a bypass band and comprises a demultiplexing unit for demultiplexing optical signals and an optical signal multiplexing unit for multiplexing optical signals and wherein each of said demultiplexing units includes an output corresponding to wavelengths included within the corresponding bypass band and selectively connected to a corresponding input of the corresponding multiplexing unit.

6. An optical self-healing ring telecommunication method in an optical telecommunication network, wherein said optical communication network comprises a first optical communication line forming a first closed optical path, a second optical communication line forming a second closed optical path and at least first and second optical signal add/drop nodes optically connected to each other along said first and second optical communication lines, the method comprising:
   feeding at least one optical signal from the first add/drop node to the second add/drop node, wherein the feeding comprises simultaneously feeding said optical signal from said first add/drop node to said first and second closed optical paths and selectively receiving said at least one optical signal in said second add/drop node from one of said first and second closed optical paths, wherein said step of selectively receiving said optical signal in said second add/drop node comprises:
   detecting the presence of said signal in said first closed optical path at said second node; and
   operatively switching reception from said first closed optical path to said second closed optical path in the absence of a signal in said first closed optical path as detected in the detecting step.

7. The optical telecommunication method of claim 6, wherein said first and second closed optical paths have opposite signal traveling directions.

8. The optical telecommunication method of claim 6, wherein said first and second optical signal add/drop nodes form a first pair of nodes optically connected with each other, wherein the signals transmitted between the first pair of nodes have a first wavelength, wherein at least one of said first and second optical paths comprises a second pair of optical signal add/drop nodes optically connected with each other and wherein the optical signals transmitted between the second pair of nodes have a second wavelength different from said first wavelength.

9. The optical telecommunication method of claim 6, further comprising:
   adding and dropping optical signals having a wavelength included within respective communication bands of first and second add/drop units included in at least one of said first and second add/drop nodes, wherein said first and second units comprise respective drop outputs of optical signals and add inputs of optical signals and wherein said step of adding and dropping optical signals comprises:
   receiving optical signals from said first and second closed optical paths, respectively;
   sending to said drop outputs the received optical signals of a wavelength included within a predetermined dropping band included in the respective communication band;
   sending to said first and second closed optical paths, respectively, the received optical signals of a wavelength included within a predetermined bypass band included within the respective communication band and having no overlap with said dropping band; and
   sending to said first and second closed optical paths, respectively, the optical signals present at said add inputs having a wavelength included within said dropping and.

10. An optical signal add/drop node for use in an optical self-healing-ring communication network including a first optical communication line forming a first closed optical path and a second optical communication line forming a second closed optical path, said optical signal add/drop node comprising:
   a first input configured to receive an input signal from the first communication line;
   a second input configured to receive an input signal from the second communication line;
   a detector configured to detect optical signal presence at the add/drop node;
   a controlled selector configured to selectively drop at least one optical signal from one of the first and second communication lines based on the detected optical signal presence by the detector; and
   a transmitter configured to simultaneously input at least one optical signal into the first and second communication lines.

11. An optical signal add/drop node of claim 10, wherein each of the first and second inputs includes a wavelength selective optical coupler.

12. An optical signal add/drop node of claim 10, wherein the controlled selector includes an optical switch.

13. The optical signal add/drop node of claim 10, wherein the first and second optical paths have opposite signal traveling directions.

14. An optical signal add/drop node of claim 10, wherein the signal add/drop node has a bypass band, and the optical signal add/drop node further comprises a demultiplexing unit configured to demultiplex optical signals and an optical signal multiplexing unit configured to multiplex optical signals, and wherein the demultiplexing unit includes an output corresponding to wavelengths included within the bypass band.

15. An optical signal add/drop node for use in an optical self-healing-ring communication network including a first optical communication line forming a first closed optical path and a second optical communication line forming a second closed optical path, said optical signal add/drop node comprising:

first input means for receiving an input signal from the first communication line;

second input means for receiving an input signal from the second communication line;

detector means for detecting optical signal presence at the add/drop node;

control means for selectively dropping at least one optical signal from one of the first and second communication lines based on the detected optical signal presence by the detector means; and  transmitter means for simultaneously inputting at least one optical signal into the first and second communication lines.

16. An optical signal add/drop node of claim 15, wherein each of the first and second input means includes wavelength selective optical coupler means for selectively coupling signals input to the first and second input means based on wavelength.

17. An optical signal add/drop node of claim 15, wherein the control means includes an optical switch means for switching a connection to the first and second communication lines.

18. The optical signal add/drop node of claim 15, wherein the first and second optical paths have opposite signal traveling directions.

19. An optical signal add/drop node of claim 15, wherein the signal add/drop node has a bypass band, and the optical signal add/drop node further comprises demultiplexing means for demultiplexing optical signals and optical signal multiplexing means for multiplexing optical signals, and wherein the demultiplexing means includes an output corresponding to wavelengths included within the bypass band.

20. An optical signal add/drop method for use in an optical self-healing-ring communication network including a first optical communication line forming a first closed optical path and a second optical communication line forming a second closed optical path, said optical signal add/drop method comprising:

receiving an input signal from the first communication line;

receiving an input signal from the second communication line;

detecting optical signal presence at the add/drop node;

selectively dropping at least one optical signal from one of the first and second communication lines based on the detected optical signal presence detected by the detecting step; and  simultaneously transmitting at least one optical signal into the first and second communication lines.

21. An optical signal add/drop method of claim 20, wherein each of the receiving steps includes a wavelength selective optical coupler.

22. An optical signal add/drop method of claim 20, wherein the selectively dropping step includes an optical switching operation.

23. The optical signal add/drop method of claim 20, wherein the first and second optical paths have opposite signal traveling directions.

24. An optical signal add/drop method of claim 20, wherein the signal add/drop node has a bypass band, and the optical signal add/drop method further comprises demultiplexing the received input optical signals and multiplexing the transmitted optical signals, and wherein the demultiplexing includes an output corresponding to wavelengths included within the bypass band.

\* \* \* \* \*